Dec. 29, 1925.  
W. F. BRIGHT  
1,567,635  
SPRING SHACKLE AND LUBRICATING MEANS THEREFOR  
Filed Nov. 12, 1920
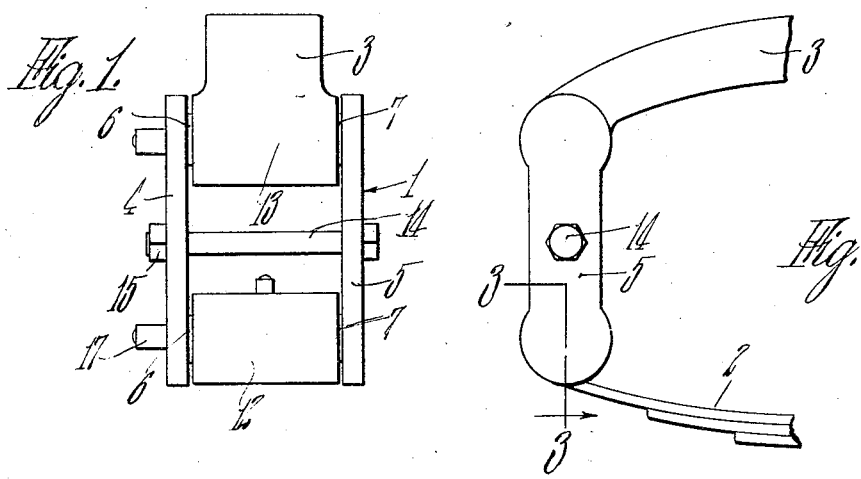
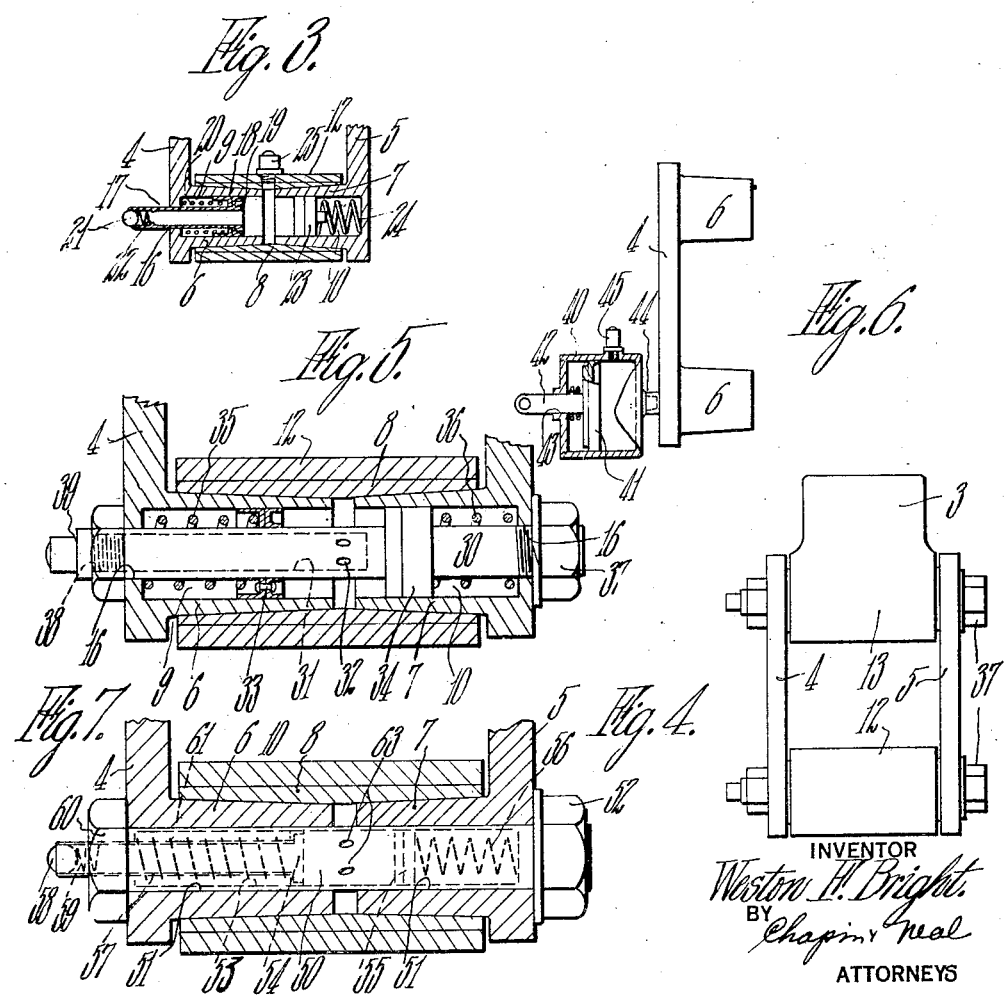
INVENTOR  
Weston F. Bright.  
BY Chapin & Neal  
ATTORNEYS Patented Dec. 29, 1925.

1,567,635

UNITED STATES PATENT OFFICE.

WESTON F. BRIGHT, OF LONGMEADOW, MASSACHUSETTS.

SPRING SHACKLE AND LUBRICATING MEANS THEREFOR.

Application filed November 12, 1920. Serial No. 423,305.

*To all whom it may concern:*

Be it known that I, WESTON F. BRIGHT, citizen of the United States, residing at Longmeadow, in the county of Hampden and State of Massachusetts, have invented new and useful Improvements in Spring Shackles and Lubricating Means Therefor, of which the following is a specification.

This invention relates to an improved spring shackle and lubricating means therefor, and has among its objects the provision of a device of this character wherein the parts may be readily adjusted to take up wear, and whereby tapered bearing surfaces are provided between the shackle and the members which it connects.

Another object of the invention is to provide improved means for lubricating the bearing surfaces whereby lubricant may be forced into a suitable reservoir provided for the purpose and automatically fed to the bearing surfaces, as necessity requires.

Other objects of the invention relate to improved details of construction and methods of operation, as will be more fully set forth in the detailed description to follow.

Referring to the drawings,—

Fig. 1 is an end elevational view of one form of the improved shackle, showing the manner of applying the same for connecting one end of the spring to the vehicle;

Fig. 2 is a side elevational view of the structure shown in Fig. 1;

Fig. 3 is a transverse sectional view, taken along the line 3—3 of Fig. 2;

Fig. 4 is an end elevational view of a modified form of shackle;

Fig. 5 is a transverse sectional view of the structure shown in Fig. 4, taken on a section similar to that of Fig. 3;

Fig. 6 is a perspective view of one of the side members, illustrating in section a form of grease cup which may be used in connection with either one of the modified structures shown.

Fig. 7 is a sectional view of another modification.

In the practical use of devices of this character, it is desirable that suitable means be provided for adjusting the side members towards and from each other to take up wear from time to time so that the parts of the shackle will always bear properly against the spring and thus undesirable noise be prevented as well as the wear upon the parts reduced to a minimum. It is also desirable to provide means for constantly urging lubricant from the reservoir containing the same into the bearings in order to secure proper lubrication of the same and maintain the parts in proper condition for use at all times and under all conditions of service.

In the embodiment of the invention illustrated herewith, the shackle 1 is shown as supporting one end of a leaf-spring 2 from a bracket 3 carried by the body of the vehicle, although it will be readily understood that the structure will readily adapt itself for connecting adjacent ends of two leaf-springs, if desired.

The shackle 1, in the form illustrated in Figs. 1, 2 and 3 of the drawings, comprises a pair of oppositely positioned side members 4 and 5, which are provided at opposite ends with alined inwardly-projecting hollow hubs 6 and 7, respectively. The hubs 6 and 7 have their outer surfaces tapered or inclined inwardly, as best shown in Fig. 3 of the drawings, for fitting within a sleeve 8 which has its inner surface correspondingly inclined outwardly from the center to the opposite ends thereof. The hubs 6 and 7 are provided with substantially centrally located counter-bored recesses 9 and 10, respectively, which recesses serve as a reservoir for lubricant for lubricating the opposing bearing surfaces of the hubs and sleeves. One of the sleeves 8 is adapted to fit over the ends of each set of oppositely-positioned alined hubs, the lower sleeve 8 fitting within the spring-eye 12, while the upper sleeve fits within and is supported by an eye 13 formed in the bracket 3. A bolt 14 is passed through the oppositely-positioned side members 4 and 5 intermediate the hubs carried thereby and is provided with a nut 15, whereby the side members may be properly adjusted relative to each other and drawn together from time to time to take up wear in the parts.

The plate 4 is provided with openings 16 communicating with the counter-bored recesses 9 formed in the hubs 6 and preferably located substantially centrally of said recesses, within which are slidably mounted tubular members 17 through which the lubricant is adapted to be forced to the reservoir formed by the recesses in the hubs. The tubular members 17 each extend inwardly into the recess formed in one of the hubs a considerable distance, and a plunger 18 is carried by each tubular member and held against removal over the inwardly-extending end of the tubular member by a nut 19 threaded upon the inwardly-projecting end of said member. A coiled spring 20 surrounds the tubular member and is positioned within the recess to bear against the plunger 18 and a portion of the side member 4 for constantly urging the plunger inwardly. A check-valve is positioned in the outwardly-projecting end of the tubular member 17 and comprises a ball 21 spring-pressed outwardly against its seat by means of a coiled spring 22.

Positioned within the recess 10 formed in each hub 7 is a slidable plunger 23, and a coiled spring 24 seats against the base of the recess and bears against the plunger to constantly force the same inwardly towards the center of the reservoir. It will be noted upon reference to Fig. 3 of the drawings that the inner ends of the oppositely-positioned alined hubs 6 and 7 are spaced apart slightly to permit of the side members being drawn together to take up wear and also facilitate the flow of lubricant from the reservoir to the bearings under the pressure exerted by the spring-pressed plungers. In the introduction of lubricant to the reservoir a grease gun of the usual construction may be attached to the outer end of the tubular member 17 and lubricant forced past the check-valve 21 against the pressure of the spring 22 until the reservoir is completely filled and the spring-pressed plungers 18 and 23 forced outwardly from the center of the reservoir against the tension of the springs 20 and 24. The grease gun is then removed from the tubular member 17 and the lubricant is gradually worked into the bearing surfaces by the constant action of the springs 20 and 24 upon the plungers 18 and 23. When the lubricant is exhausted or nearly exhausted from the reservoir, this condition will be indicated by the position of the tubular member 17, which is drawn inwardly by inward movement of the plunger 18. A grease cup 25 may be provided in the spring-eye 12 for feeding additional lubricant between the eye and the outer surface of the sleeve 8, as is common in devices of this character.

In the form of the invention shown in Figs. 4 and 5 of the drawings, the oppositely-positioned side members are of similar construction to those previously described, as are also the oppositely-positioned inwardly-projecting hubs formed thereon, except that in this form of the invention both of the side members are provided with openings 16 extending therethrough and preferably located centrally with respect to the recesses formed in the hubs. The sleeve 8 is also similar in all respects to that employed in the form shown in Figs. 1, 2 and 3 of the drawings and is similarly located relative to the oppositely-positioned alined hubs. In this form of the invention, however, the bolt 14 located intermediate the ends of the side members is dispensed with and similarly formed bolts 30 are passed through the alined openings formed in opposite ends of the side members in such a manner as to extend through the hollow recesses formed in the oppositely-positioned alined hubs, as shown in Fig. 5 of the drawings. The bolts 30 are of similar construction and each of these bolts is provided with a counter-bored recess 31 which extends inwardly longitudinally thereof and which is provided at its inner end adjacent the central portion of the reservoir formed by the recesses 9 and 10 in the hubs with a plurality of radial passages 32, whereby lubricant may be forced from the counter-bored recess 31 into the reservoir. Annular plungers 33 and 34 are slidably mounted upon the bolt and located in the recesses 9 and 10, respectively. A coiled spring 35 is located in the recess 9 surrounding the bolt and bears at one end against the side member 4 and at its opposite end against the plunger 33 to constantly force the plunger 33 inwardly and feed lubricant from the reservoir to the bearing surfaces. A similar coiled spring 36 is located in the recess 10 and acts in a similar manner against the plunger 34. A nut 37 is threaded upon the end of each bolt 30 and is adapted to be threaded thereon a sufficient distance to hold the hubs properly positioned in the sleeve and take up wear between the bearing surfaces. A thread 38 is formed in the outer end of the recess 31, within which a grease cup 39, of suitable construction, may be threaded, and upon attachment of a grease gun of suitable construction to the cup 38 lubricant may be forced through the recess 31 and the radial passages 32 into the reservoir between the plungers 33 and 34 until the reservoir is sufficiently filled. The springs 35 and 36 act constantly upon the plungers to force them inwardly and thus press the lubricant between the bearing surfaces.

A form of grease cup such as is shown in Fig. 6 of the drawings may, if desired, be substituted for the grease cup 39 shown in Fig. 5 for introducing lubricant into the reservoir. The grease cup 40 shown in Fig. 6 of the drawings comprises a casing of substantially uniform interior cross-section, in which is slidably mounted a plunger 41 from one side of which an arm 42 projects to extend outwardly through an opening 43 formed in one of the walls of the casing, as shown in Fig. 6. A threaded hollow extension 44 projects from the opposite side of the casing and is adapted to be threaded within the threaded portion of the recess 31, whereby lubricant may be forced through the recess 31 and into the reservoir by pressure being applied to the arm 42. Lubricant may be introduced into the casing 40 by connecting a grease gun of suitable constuction to the connection 45, as will be readily understood. By pressure upon the arm 42, lubricant is forced through the hollow extension 44 into the reservoir between the spring-pressed plungers 33 and 34, and the position of the arm 42 will indicate to the operator when it is necessary to again fill the cup 40 with lubricant.

While the cups 39 and 40 have been referred to in the foregoing description as "grease cups", it is to be understood that either liquid or solid lubricant may be employed in connection with these cups, as well as for filling the reservoirs shown in Figs. 3 and 4 of the drawings, as conditions may require or the necessity of the particular case render expedient.

In the form of the invention shown in Fig. 7 of the drawings, the side members 4 and 5 are provided with alined inwardly-projecting hollow hubs 6 and 7, respectively, similar to those previously described, which fit within a sleeve 8 provided in the spring-eye 10. In this form of the invention, however, the bolt 50 is of such size as to completely fill the central openings 51 extending through the side members 4 and 5 and the hubs 6 and 7 extending inwardly therefrom. The bolt is provided with a nut 52 for drawing the side members 4 and 5 together and adjustably holding them in proper engagement with the sleeve 8 to provide a suitable fit between the parts and prevent excessive wear. The bolt is provided with a substantially centrally located longitudinally-extending counter-bored recess 53 which extends nearly the entire length of the bolt and within which is positioned a pair of slidable plungers 54 and 55. A coiled spring 56 is positioned in the rear of the plunger 55 to constantly urge the plunger inwardly towards the center of the bolt. A sleeve 57 extends outwardly from the plunger 54 beyond the end of the bolt 50 and is provided at its outer end with a check-valve 58 which is suitably forced outwardly into engagement with its seat by a coiled spring 59 to prevent leakage of lubricant from the recess 53 while permitting lubricant to be forced into the recess against the tension of the spring by applying a suitable grease gun to the outer end of the sleeve 57. A cap-piece 60 is threaded into the outer end of the recess 53 for closing the open end of the recess, and the sleeve 57 is slidably mounted in a suitably formed opening in the cap-piece. A coiled spring 61 surrounds the sleeve 57 within the recess, bearing at one end against the plunger 54 and at its opposite end against the cap-piece to constantly urge the plunger inwardly to force the lubricant from the recess 53 through radial passages 63 formed in the bolt, whereby the lubricant may be forced between the bearing surfaces to lubricate the same. The effect of the coiled springs 56 and 61 may be supplemented by pressing inwardly upon the outwardly-projecting end of the sleeve 57 to force the plungers 54 and 55 together and thus press lubricant between the bearing surfaces.

While the construction shown in the drawings has been described with considerable particularity in order to make the construction and operation of the same clear to those skilled in the art, it is to be understood that the invention is not limited to the precise details of construction shown and described, or any of them, except as such limitations are included in the following claims.

What I claim is:

1. A spring shackle, comprising a pair of separate and oppositely positioned side members having integral therewith aligned inwardly projecting hubs having their outer surfaces tapering inwardly, a sleeve having a surface for fitting over said hubs, and means connecting said side members adapted to be adjusted to move said members toward one another to take up wear between the hubs thereof and the sleeve and to prevent an axial movement of the bushing with respect to the side members.

2. A spring shackle, comprising a pair of oppositely positioned and relatively movable side members having integral therewith aligned inwardly projecting hollow hubs having their outer surfaces tapering inwardly, a sleeve having a surface for fitting over said hubs and a bolt extending through the said aligned hubs for moving said side members toward one another to take up wear between the sleeve and hubs and to prevent an axial movement of said sleeve and side members.

3. A spring shackle, comprising in combination, a pair of oppositely-positioned side members provided with alined inwardly-projecting hollow hubs having their outer surfaces tapered inwardly, sleeves adapted to fit over the ends of each set of alined hubs, means carried by one of said side members for conducting lubricant into the interior of the alined hollow hubs, and means positioned interiorly of the hubs for feeding the lubricant to the bearing surfaces.

4. A spring shackle, comprising in combination, a pair of oppositely-positioned side members provided with alined inwardly-projecting hollow hubs having their outer surfaces tapered inwardly, sleeves adapted to fit over the ends of each set of alined hubs, means carried by one of said side members for conducting lubricant into the interior of the alined hollow hubs, and spring-actuated plungers positioned interiorly of said hubs for feeding the lubricant to the bearing surfaces.

5. A spring shackle, comprising in combination, a pair of oppositely-positioned side members provided with alined inwardly-projecting hollow hubs, sleeves adapted to fit over the ends of each set of alined hubs, a bolt extending through the hollow interiors of oppositely-positioned hubs, said bolt being provided with a longitudinal passage through which lubricant may be fed to the interior of the hubs, and means positioned interiorly of the hubs for feeding the lubricant to the bearing surfaces.

6. A spring shackle, comprising in combination, a pair of oppositely-positioned side members provided with alined inwardly-projecting hollow hubs, sleeves adapted to fit over the ends of each set of alined hubs, a bolt extending through the hollow interiors of oppositely-positioned hubs, said bolt being provided with a longitudinal passage through which lubricant may be fed to the interior of the hubs, and spring-actuated plungers positioned interiorly of the hubs for feeding the lubricant to the bearing surfaces.

7. A spring shackle, comprising in combination, a pair of oppositely-positioned side members provided with alined inwardly-projecting hollow hubs, a lubricating bolt for holding the said side members against separation, said bolt being provided with means for conducting lubricant between the ends of the said hubs, and spring-actuated means within the said bolt for feeding lubricant to the bearing surfaces.

In testimony whereof I have affixed my signature.

WESTON F. BRIGHT.